March 6, 1956 E. H. WENZEL 2,737,414
COMBINED WATER SPRAY AND CHEMICAL DISPENSER
Filed March 2, 1955 2 Sheets-Sheet 1

INVENTOR.
Edwin H. Wenzel
BY Ralph G. Hohenfeldt
Attorney

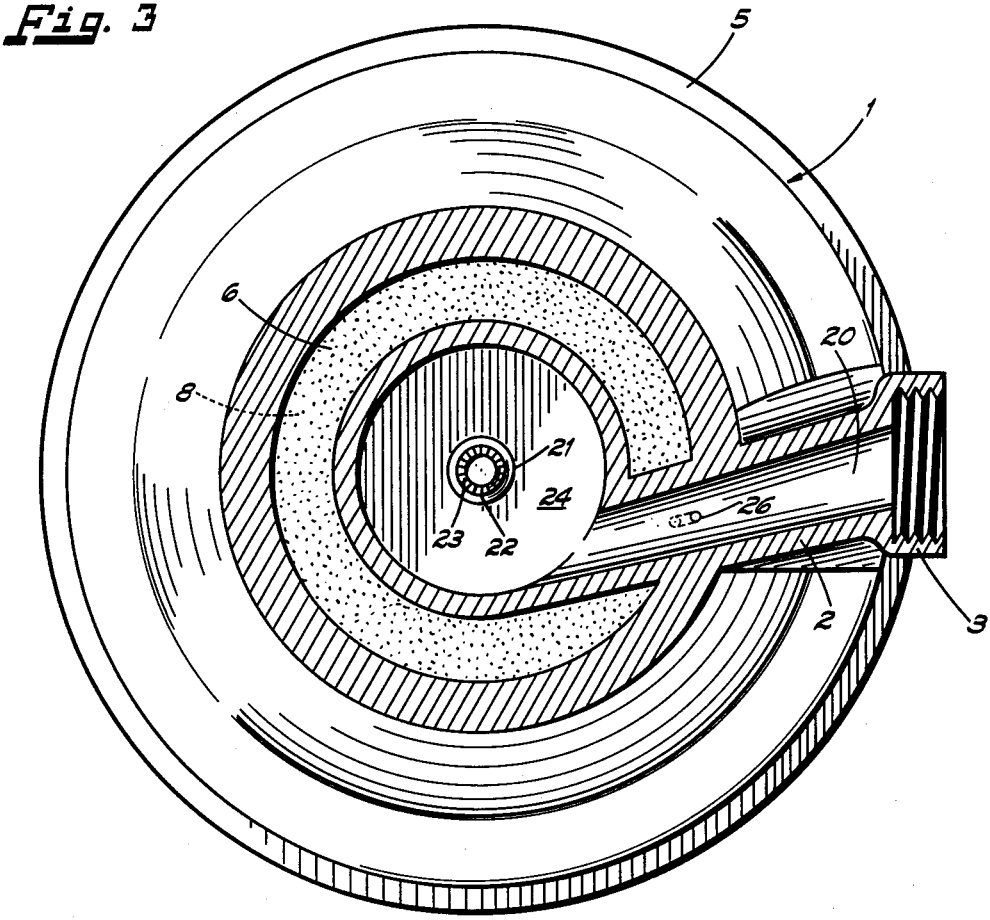

United States Patent Office 2,737,414
Patented Mar. 6, 1956

2,737,414

COMBINED WATER SPRAY AND CHEMICAL DISPENSER

Edwin H. Wenzel, Fox Point, Wis.

Application March 2, 1955, Serial No. 491,676

5 Claims. (Cl. 299—84)

This invention relates to a device for spraying water on lawns and other areas covered by vegetation, and more particularly relates to apparatus which combines this function with that of simultaneously dispersing chemicals, weed killers or fertilizers of the water soluble type upon such areas.

A general object of this invention is to provide a unit including a chemical storage reservoir which facilitates storing and gradually dissolving therein the chemical to be dispersed and removal of the solute created thereby through aspirator action for admixture with a heavier flow of water by way of which it is ultimately disseminated over a circular pattern in diminishing concentration.

Another object of this invention is to provide a chemical dispersing device which is of simple and rugged construction and which will not be subject to corrosion or plugging after prolonged use.

A further object is to provide a device of the aforementioned type which is easy to operate and maintain by virture of the absence of any moving parts.

Another specific feature of this invention resides in its ability to be adjusted for producing a spray pattern of greater or lesser radius and for controlling the rate at which the chemical solution is consumed and dispersed.

Other specific objects will appear from time to time throughout the course of the forthcoming detailed description.

In the accompanying drawings whereby a preferred embodiment of the invention is illustrated:

Like elements are designated by like reference characters throughout the several views.

In its broadest aspect the invention includes a reservoir into which any miscible granular or liquid chemical may be deposited, the term chemical being here understood to include fertilizing compounds, weed killers and so forth whether of organic or inorganic nature.

Water under pressure is admitted from any source such as a garden hose to a mixing chamber defined by a cover element which is detachably mounted on and seals a reservoir. This mixing chamber has leading from it an outlet orifice and a tubular member that communicates with the reservoir for the purpose of educting the solute and admixing the same with the main flow of water as it passes from the orifice for dispersal over a wide pattern. An additional jet is provided which supplies water from the inlet to the reservoir for the purpose of agitating its contents and supplanting the liquid solute removed through aspiration.

Figure 1:
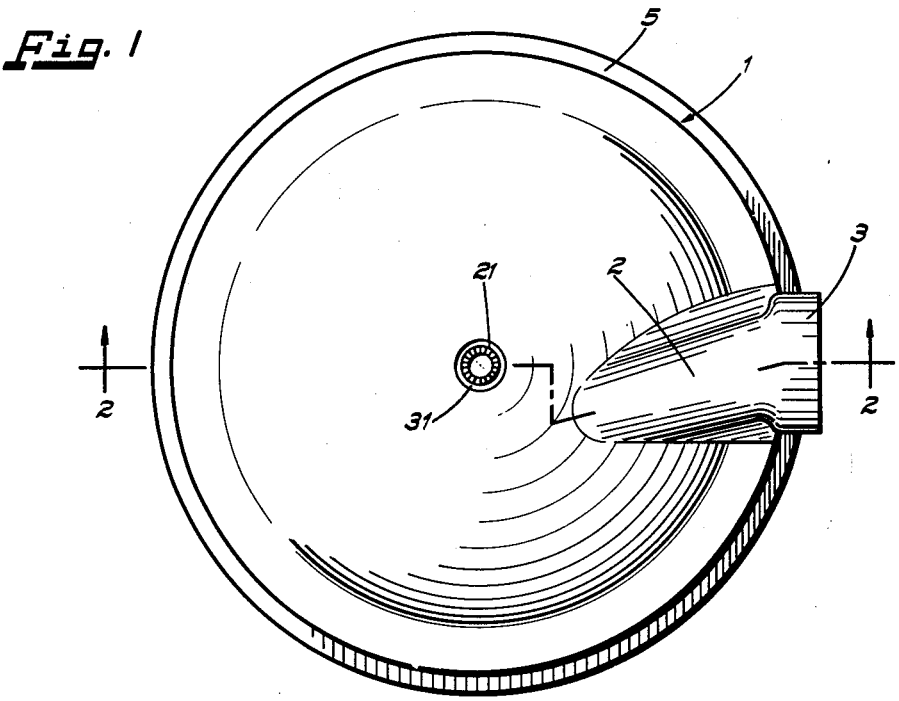
Fig. 1 is a top plan view of the assembled chemical dispenser forming the subject of this invention.

Referring to Fig. 1, for a more detailed explanation of the invention, it will be noted that the device comprises a metallic cover 1, preferably cast in aluminum or other corrosion resistant metal, having integral therewith a neck portion 2 terminating in a round cross sectional internally threaded adapted 3 to which an ordinary garden hose, not shown, may be attached.

Figure 2:
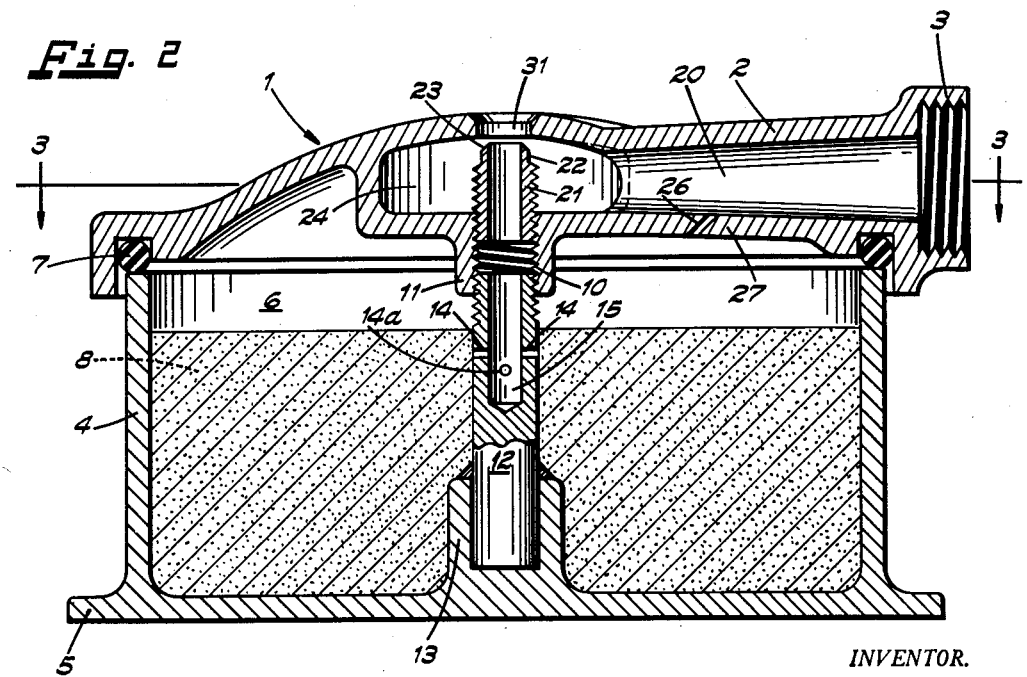
Fig. 2 is a sectional elevational view of the dispenser taken on the line 2—2 of Fig. 1; and, Fig. 3 is a plan view, in section, taken on line 3—3 of Fig. 2 showing in greater detail the scroll chamber in which the chemical solute is admixed with the principal water flow.

By reference to Fig. 2 it will be seen that the reservoir 4 is of hollow cylindrical conformation, likewise preferably cast of aluminum, and is provided with an integral radially extending flange 5 for the purpose of stabilizing the device when set on an irregular surface. The reservoir 4 may have its interior space filled, or partially so, with a water soluble chemical 8 before the lawn sprinkling operation is commenced. A resilient ring gasket 7 is positioned in an annular groove 8 in the cover in concentric relation with wall of the reservoir and interposed between cover 1 and reservoir 4, see Fig. 2, for the purpose of establishing a pressure tight seal.

The interior of the cover is provided with boss or extension 11 having a threaded opening 10 extending to the chamber 24. Directly above the opening 10, an outlet orifice 31 is provided in the top wall of the chamber 24. Cover 1 is firmly secured to reservoir 4 through engagement of the threads in opening 10 with the threaded upper end of the solute conveying tube 12, preferably of brass. Tube 12 is in turn firmly anchored at the bottom of reservoir interior 6 in an upward central protuberance 13 cast into the reservoir. The tube may have its end which resides in protuberance 13 knurled and die cast into position or it may be screwed therein, the choice being within the purview of a skilled artisan. Although the ring gasket 7 is not shown in compressed relation with the top margin of the wall of reservoir 4, it should be clear from the foregoing that cover 1 may be manually turned into watertight relationship with reservoir 4.

Referring to Fig. 2 it will be apparent how the chemical solute 8 from reservoir interior 6 is educted for admixture with the main stream of water derived from tapered inlet passageway 20, in the cover. This is accomplished by providing tube 12 with a plurality of small apertures 14 and 14a which connect reservoir interior 6 with the bore 15 of the tube. The pairs of apertures 14 and 14a, respectively, are formed by drilling tube 12 diametrically at two longitudinally spaced points to the end that the tubes cross sectional area is not severely reduced at any place, its torsional strength is maintained and a somewhat better aspirating action results. The bore 15 of tube 12 is in substantial axial registration with the bore of the short nozzle 21.

Nozzle 21 is exteriorly threaded for registry with a continuation of the same thread 10 by which cover extension 11 is connected with tube 12. Note that nozzle 21 terminates in a tip 22 having a chamfered margin 23 provided with substantially radial V-grooves or serrations for the purpose of enhancing its hydrodynamic properties. As indicated in Fig. 2, orifice 31 in the upper wall of the chamber 24 is co-axial with the nozzle 21 and spaced therefrom for discharging into free space above the nozzle the solute 8 educted from reservoir chamber 6 through the passageway indicated in the last two paragraphs.

By reference to Fig. 3 in conjunction with Fig. 2 it will be observed that nozzle 21 projects into a cored out mixing chamber 24 having a scroll conformation and directly communicating with tapered inlet passage 20. The relationship of mixing chamber 24 and inlet 20 is such that water flows from the latter tangentially into the former, thus creating a rapidly swirling mass of water having a vortex in the zone of nozzle tip 22.

Pressure developed by the centrifugal action of the water within mixing chamber 24 insures that water delivered from inlet passage 20 will be ejected at very high velocity from discharge orifice 31. Since the hydraulic system embodied by the invention is a closed one, where the velocity of flow is high due to a constriction such in orifice 31 the pressure is correspondingly low in accordance with well established hydrodynamic principles. It follows then that the low pressure zone directly above nozzle tip 22 has the effect of causing the solute to flow upwardly in tube bore 15, out of nozzle 21 and into the gyrating stream emitted from orifice 31.

An inclined opening 26 is provided in the bottom section 27 of cover 1 for conducting a small jet of water from the high pressure zone prevalent in inlet passage 20 to reservoir 6 for the purpose of supplanting the chemical solution educted by the above described aspirator action and for enhancing aspiration by pressurizing the reservoir. Note in Fig. 2 that jet or inlet hole 26 is directed angularly downward toward the bottom of the reservoir and in Fig. 3 tangentially relative to cylindrical path disposed between the tube 12 and wall of the reservoir 4 so that it serves to agitate and gyrate the mass of solution remaining in reservoir 6. After prolonged use the entire soluble chemical will be dispersed in a circular pattern on the surrounding vegetation and only pure water will emanate from orifice 31. This is, of course, advantageous because it is highly desirable that potent chemical fertilizer solutions be copiously sprinkled after their distribution in order that burning of tender plants be avoided.

Another important characteristic of the novel water spray device is its flow intensity adjustment feature. This results from nozzle 21 being screw mounted in thread 10. By merely inserting a small screw driver therein through orifice 31 or through the bottom when cover 1 is removed, nozzle 21 may be advanced or retracted with respect to the orifice. Hence, a very low quantity fine spray occurs when nozzle 21 nears orifice 31, and conversely, a coarse spray occurs when the nozzle is screwed inwardly. By advancing tip 22 of nozzle 21 into orifice 31 the outflow of water from the orifice may be substantially stopped.

From the aforegoing description taken in conjunction with the accompanying drawing it is evident that a very facile means has been described for distributing chemical compounds through the agency of a water vehicle. Moreover, it should be apparent that the device may be conveniently reloaded without detachment from the water supply hose and that it presents a neat streamlined appearance by reason of the absence of any movable parts and its polished aluminum body. In addition, the device may be completely disassembled, cleaned and utilized by those endowed with a bare minimum of mechanical skill.

Although only a preferred form of the invention has been described it is realized that such description will suggest alternative embodiments to those skilled in the art but it is intended that the scope of the invention be limited only by the claims which follow.

It is claimed:

1. A combined water spray and chemical dispensing device, comprising in combination a container, a tube within said container secured to and extending from the bottom thereof, said tube being threaded at its end remote from said bottom and having an aperture intermediate its ends placing the interior of said tube and said container in communication with each other; a cover for said container having a scroll shaped mixing chamber, a water inlet passage tangential to said chamber, and a jet aperture extending from the inlet passage to the interior of said container at an angle toward said tube but tangential to a circular path about said tube, opposite walls of said mixing chamber having an orifice and an aperture, respectively, both coaxial with said tube, the aperture in the wall of said chamber adjacent said container being threadedly engaged with said tube, and a nozzle threadedly engaging said aperture in said wall coaxially with said tube and adjustable relative to the orifice in the wall of said mixing chamber more remote from said container.

2. A combined water spray and chemical dispensing device, comprising in combination a container, a tube within said container secured to and extending from the bottom thereof, said tube being threaded at its end remote from said bottom and having an aperture intermediate its ends placing the interior of said container and said tube in communication with each other; a cover for said container having a scroll shaped mixing chamber, a water inlet passage tangential thereto and a jet aperture extending from the inlet passage to the interior of said container at an angle toward said tube but tangential to a circular path about said tube, opposite walls of said mixing chamber having an orifice and an aperture, respectively, both coaxial with said tube, the aperture in the wall of said cover adjacent said container being threadedly engaged with said tube, and a nozzle threadedly engaging said aperture in said wall coaxially with said tube and extending into said mixing chamber, said nozzle having a discharge opening in aligned proximity with said orifice and being spatially adjustable relative thereto through the medium of its screw thread, whereby the quantity of fluid discharge from said nozzle may be proportioned with respect to the total outflow from said orifice.

3. A combined water spray and chemical dispensing device according to claim 2 wherein the nozzle is characterized by its having a cylindrical tip portion of lesser diameter than said orifice and a chamfered margin thereon, the nozzle tip being advanceable and retractable into and away from said orifice.

4. A combined water spray and chemical dispersing device according to claim 2 wherein the nozzle has a cylindrical tip portion of substantially the same diameter as said orifice and a chamfered margin thereon provided with radially disposed grooves.

5. A combined water spray and chemical dispensing device, comprising in combination a container, a cover engageable with and sealably enclosing said container, said cover having a mixing chamber, a water inlet passage connected therewith and a jet aperture extending from the inlet passage to the interior of said container at an acute angle with respect to bottom thereof but tangential to the interior periphery of said container, opposite walls of said mixing chamber having an orifice and a threaded aperture, respectively, a tube engaged with said threaded aperture and extending into the interior of said container, said tube having an aperture placing the interior of said container in communication with the interior of said tube, a nozzle threadedly engaged with said threaded aperture coaxially with said tube and extending into said mixing chamber in coaxial proximity with said orifice, said nozzle being advanceable and retractable on its screw thread with respect to said orifice, whereby the proportion of fluid educted from said container may be varied with respect to the total quantity of fluid discharged from said orifice.

References Cited in the file of this patent

UNITED STATES PATENTS

| | | |
|---|---|---|
| 2,120,807 | Kundel | June 14, 1938 |
| 2,580,629 | Wenzel | Jan. 1, 1952 |
| 2,680,044 | Smith | June 1, 1954 |